United States Patent [19]

Nakajima

[11] 4,404,510

[45] Sep. 13, 1983

[54] ELECTRONIC TIMEPIECE

[75] Inventor: Fumio Nakajima, Tokorozawa, Japan

[73] Assignee: Citizen Watch Co., Ltd., Tokyo, Japan

[21] Appl. No.: 231,861

[22] Filed: Feb. 5, 1981

[30] Foreign Application Priority Data

Feb. 6, 1980 [JP] Japan ................................ 55-12848

[51] Int. Cl.[3] ............................................ H02K 29/04

[52] U.S. Cl. .................................... 318/696; 318/685; 368/157

[58] Field of Search ...................... 310/40 MM, 40 R; 318/696; 368/76, 80, 155-160

[56] References Cited

U.S. PATENT DOCUMENTS 4,192,131 3/1980 Hosokawa et al. ................ 318/696

*Primary Examiner*—J. V. Truhe
*Assistant Examiner*—Saul M. Bergmann
*Attorney, Agent, or Firm*—Bernard, Rothwell & Brown

[57] ABSTRACT

An electronic timepiece comprising a step motor composed of an electromagnetic coil excited by two phase alternating driving signals, characterized by comprising means for changing over the electromagnetic coil from a closed circuit condition to an open circuit condition and vice versa, means for detecting shocks, means for discriminating the shock direction, and means for controlling the driving signal.

5 Claims, 22 Drawing Figures

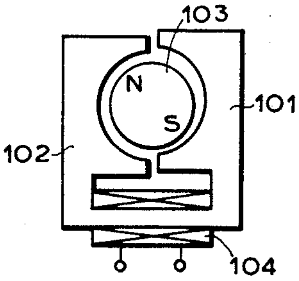
FIG. 8 (1)
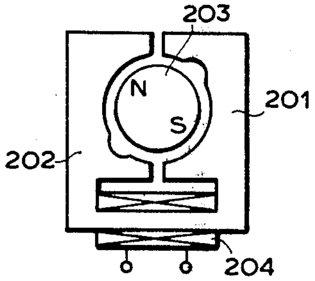
FIG. 8 (2)
FIG. 9 (1)
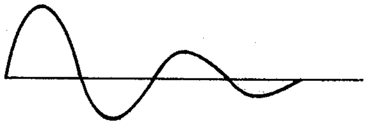
FIG. 9 (2)
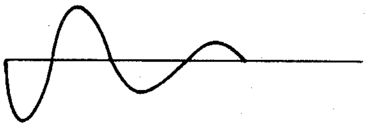
FIG. 9 (3)
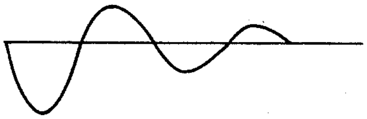
FIG. 9 (4)
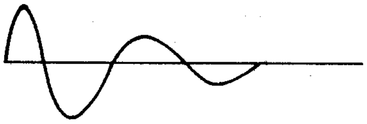
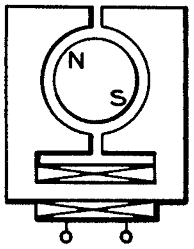
FIG. 9 (5)
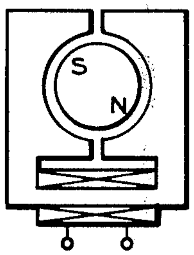
FIG. 9 (6)

ELECTRONIC TIMEPIECE

BACKGROUND OF THE INVENTION

1. Field of the Invention

This invention relates to an electronic timepiece which can effect the compensation operation with respect to external shock so as to prevent its erroneous operation.

2. Description of the Prior Art

Many attempts have been made to drive a step motor by a small power output under no load or light load and by a large power output under a heavy load. In this case, the load mainly consists of a solid resistance load such as a wheel train, week date feeding mechanism or the like and of a fluid resistance load such as oil or the like. The above mentioned attempts can compensate for these loads, but are insufficient in compensation action with respect to the external shock load and hence have the drawback that, when a step motor is reversely rotated by 1 step due, for example, to the reversely rotating shock, the timepiece is delayed by 2 seconds. As a result, in order to prevent the step motor from rotating in a reverse direction, the drag torque between the permanent magnet rotor and the stator can not be made too large. As a result, the power input required to rotate the rotor by 1 step for the purpose of making the potential energy large becomes large. Thus, it is impossible to reduce the electric power required for the electronic timepiece to a value smaller than a certain limit.

SUMMARY OF THE INVENTION

An object of the invention, therefore, is to provide an electronic timepiece which can eliminate the above mentioned drawbacks which have been encountered with the prior art techniques, which can effect the compensation action with respect to the shock load so as to stabilize the step operation of the motor, and which can further reduce the electric power to be consumed by the motor.

A feature of the invention is the provision in an electronic timepiece comprising a step motor composed of an electromagnetic coil excited by two phase alternating driving signals, a permanent magnet rotor and a stator, of the improvement comprising means for changing over said electromagnetic coil from a closed circuit condition to an open circuit condition and vice versa, means for detecting shocks and operative to detect an induced voltage to be generated in the electromagnetic coil when said rotor under its standstill condition is subjected to external shock, means for discriminating the shock direction by the difference between the output delivered from said shock detection means and the driving signal, and means for controlling the driving signal on the basis of the output delivered from said shock direction discriminating means.

Further objects and features of the invention will be fully understood from the following detailed description with reference to the accompanying drawings.

BRIEF DESCRIPTION OF THE DRAWINGS

FIGS. 8(1) and 8(2) are plan views of two examples of a step motor for electronic timepieces;

FIGS. 9(5) and 9(6) are plan views illustrating the conditions when the step motor is subjected to the shock;

FIGS. 9(1), 9(2), 9(3) and 9(4) are wave form diagrams showing induced voltage wave forms to be generated at one end of an electromagnetic coil;

DETAILED DESCRIPTION OF THE PREFERRED EMBODIMENTS

Figure 1:
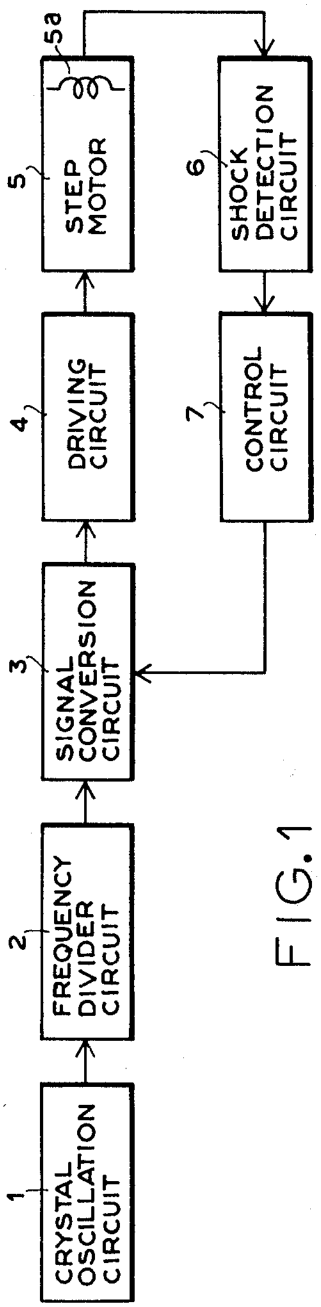
FIG. 1 is a block diagram of one embodiment of an electronic timepiece as a whole according to the invention.

FIG. 1 shows one embodiment of an electronic timepiece as a whole according to the invention. In FIG. 1, reference numeral 1 designates a crystal oscillation circuit operative to generate a signal to be used as a reference signal to the timepiece; 2 a frequency divider circuit composed of a multistage flipflop and operative to divide the frequency of the signal delivered from the crystal oscillation circuit 1 into 1 second signal required for the timepiece; 3 a signal conversion circuit operative to combine the outputs delivered from proper output stages of the frequency divider circuit 2 so as to generate a normal driving signal required under normal condition, a compensation driving signal for compensating an erroneous operation of a step motor when it is subjected to a reversely rotating shock, a delay driving signal operative, when the step motor is subjected to the shock immediately before generation of the normal driving signal, to delay the normal driving signal until the shock has ceased, a 2 phase high frequency signal operative to open or close an electromagnetic coil at a high speed, a signal showing difference in phase of the normal driving signal and any other signals required for detecting the shock, and 4 a driving circuit operative to be driven by the signal conversion circuit 3 and drive a step motor 5. The step motor 5 is connected through a transmission mechanism such as a wheel train or the like to a display means such as an hour hand, minute hand, second hand or the like, not shown in FIG. 1. Reference numeral 6 designates a shock detection circuit operative to detect the induced voltage generated in an electromagnetic coil 5*a* when the step motor is subjected to an external shock load during the period when the driving signal is supplied from the driving circuit 4 to the step motor 5 and throughout total duration except several milliseconds after the supply of the driving signal has been stopped and supply its output to a control circuit 7. The control circuit 7 functions to discriminate the direction of the shock on the basis of the signal delivered from the shock detection circuit 6 and the phase signal of the driving signal delivered from the signal conversion circuit 3 so as to generate a control signal which is supplied to the signal conversion circuit 3 and delay the driving signal and functions to generate a compensation driving signal if the step motor is subjected to the reversely rotating shock.

The invention will now be described in detail with reference to FIG. 3 which concretely shows essential parts of an electronic timepiece according to the invention.

Figure 3:
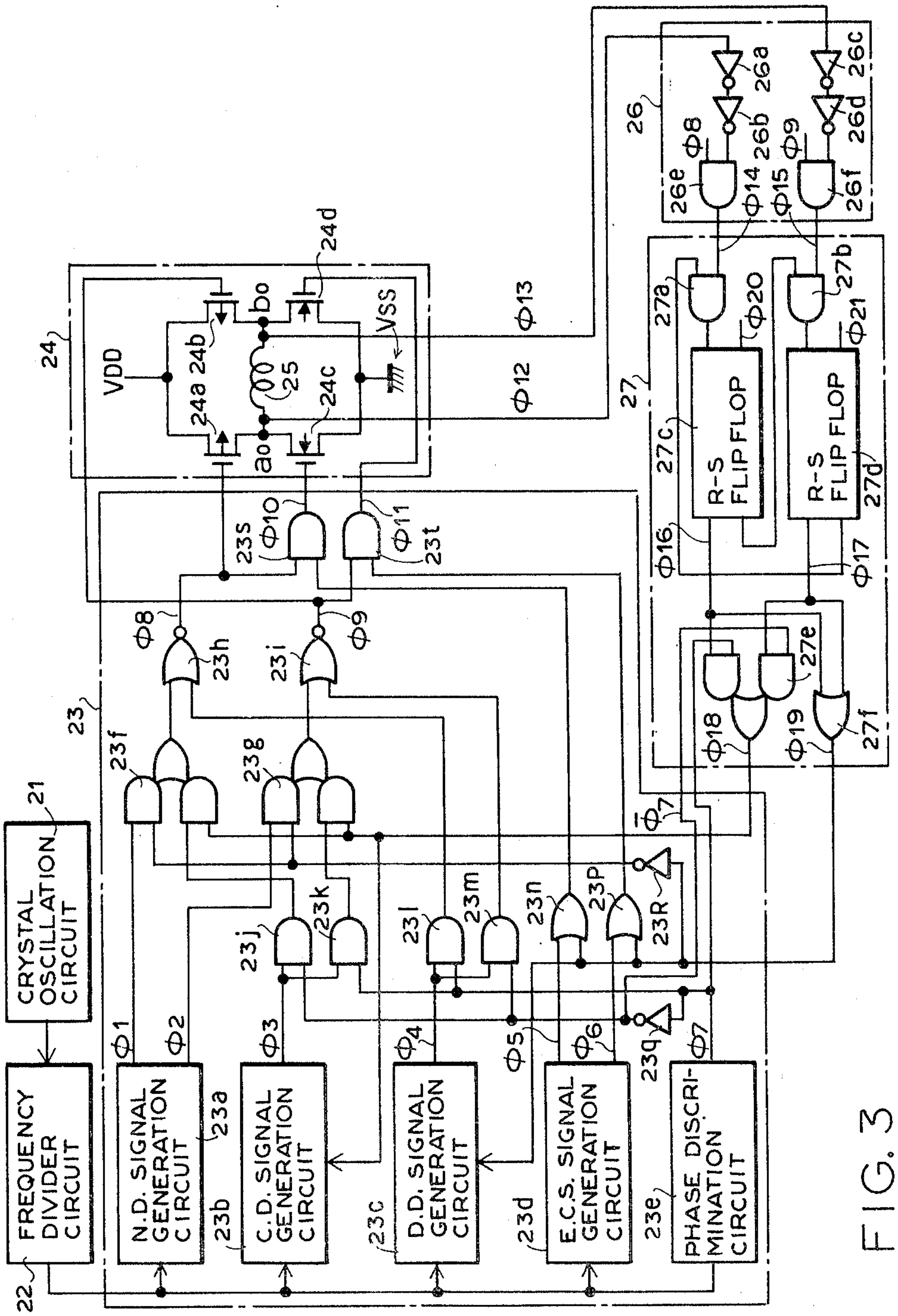
FIG. 3 is a block diagram of essential parts of the electronic timepiece shown in FIG. 2.

In FIG. 3, reference numeral 21 designates a crystal oscillation circuit; 22 a frequency divider circuit which functions in the same manner as that shown in FIG. 1; 23 a signal conversion circuit composed of a normal driving signal generation circuit 23*a*, compensation driving signal generation circuit 23*b*, delay driving signal generation circuit 23*c*, electromagnetic coil switching signal generation circuit 23*d*, phase discrimination circuit 23*e* for the normal driving signal, selection gates 23*f*, 23*g*, NOR gates 23*h*, 23*i*, AND gates 23*j*, 23*k*, 23*l*, 23*m*, OR gates 23*n*, 23*p*, and inverters 23*q*, 23*r*. Each of these circuits function to generate a signal required for its role by means of a combination of the outputs delivered from the proper output stages of the frequency divider circuit 22. These signals can easily be generated, so that means for generating these signals are not shown in FIG. 3.

The normal driving signal generation circuit 23*a* generates alternately at every 1 second alternate pulse signals $\phi_1$, $\phi_2$, the output terminals for delivering these signals $\phi_1$, $\phi_2$ being properly connected to input terminals of the selection gates 23*f*, 23*g*.

The compensation driving signal generation circuit 23*b* generates a signal $\phi_3$ required for the compensation driving operation when the step motor is subjected to the reversely rotating shock, the output terminal for delivering this signal $\phi_3$ being connected to input terminals of the AND gates 23*i*, 23*k* whose respective output terminals are connected to respective input terminals of the selection gates 23*f*, 23*g*. This compensation driving signal $\phi_3$ is set to be generated after the shock has ceased, so that its pulse width may be made equal to the pulse width of the normal driving signals $\phi_1$, $\phi_2$.

In the present embodiment, the pulse width of the normal driving signals $\phi_1$, $\phi_2$ and compensation driving signal $\phi_3$ is set to a pulse width which is shorter than 5.9 m sec. In addition, each of these signals may be of a split pulse instead of a continuous pulse.

The output terminals of the selection gates 23*f*, 23*g* are connected to input terminals of the NOR gates 23*h*, 23*i* whose output terminals are connected to the input terminals of the AND gates 23*s*, 23*t* and to a driving circuit 24.

The delay driving signal generation circuit 23*c* generates a delayed driving signal $\phi_4$ when the step motor is subjected to the shock immediately before the normal driving signal and after the shock has ceased. The output terminal of the delay driving signal generation circuit 23*c* is connected to input terminals of the AND gates 23*l*, 23*m* whose output terminals are the input terminals of the NOR gates 23*h*, 23*i*.

Figure 4:
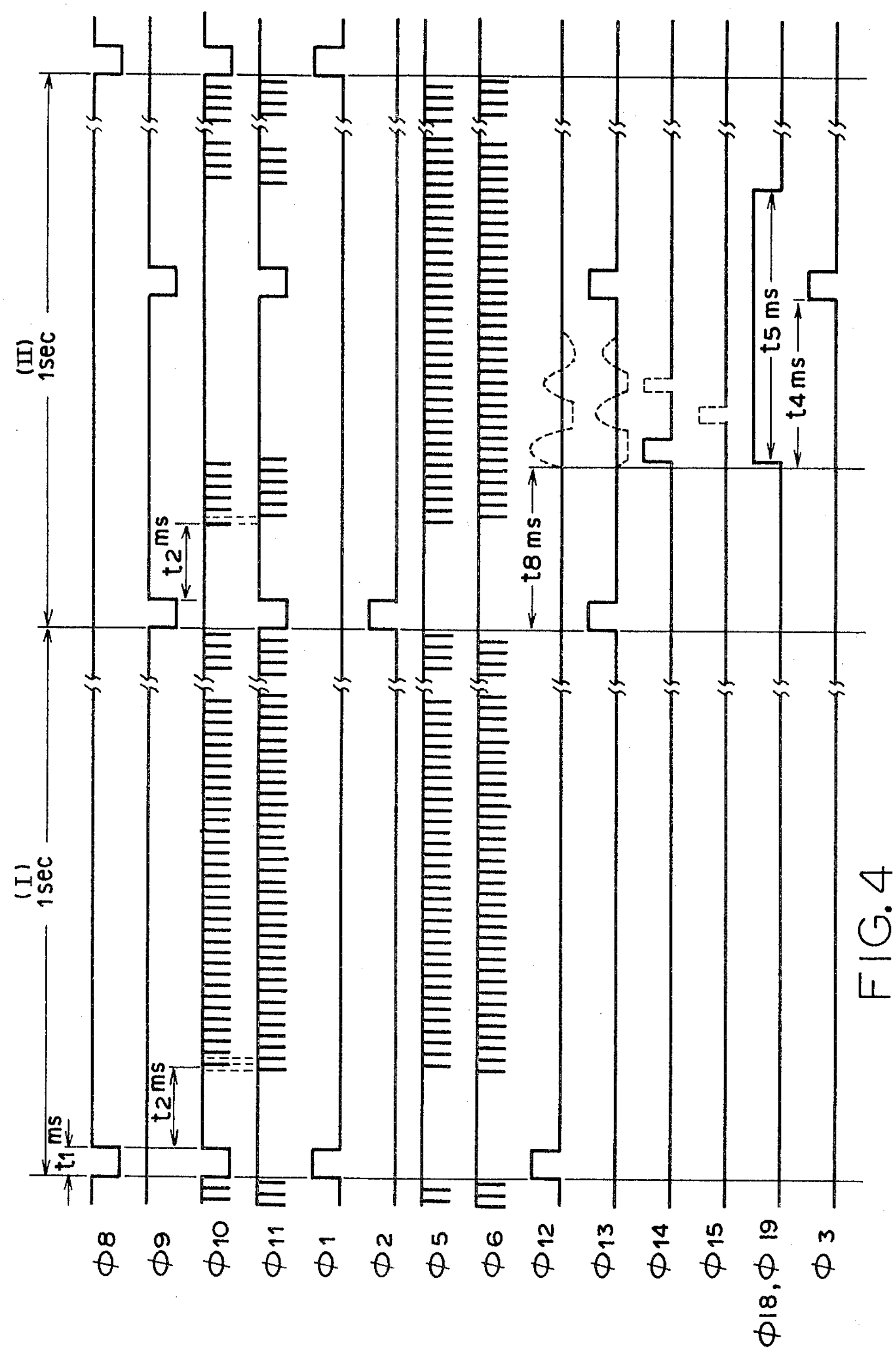
FIG. 4 is a time chart illustrating outputs signals delivered from respective parts shown in FIG. 3 under the condition in which the step motor is subjected to the reversely rotating shock.
Figure 10:
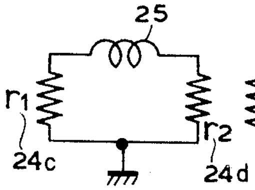
FIGS. 10(5), 10(6), 10(1), 10(2), 10(3) and 10(4) are diagrams for illustrating the operation of a driving circuit when it is supplied with an electromagnetic coil switching signal.
Figure 10:
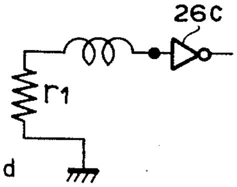
Figure 10:
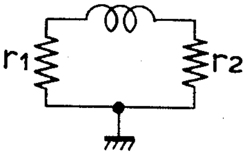
Figure 10:
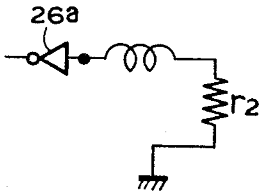
Figure 10:
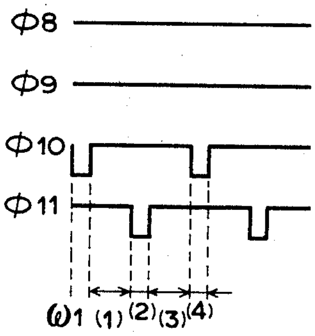
Figure 10:
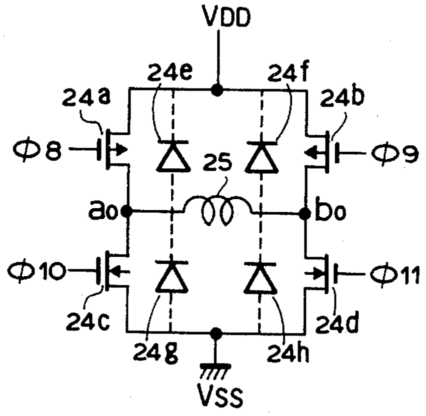

The electromagnetic coil switching signal generation circuit 23*d* generates a relatively high frequency continuous signal having a pulse width $\omega_1$ such as signals $\phi_5$, $\phi_6$ shown in FIG. 4 and $\phi_{10}$, $\phi_{11}$ shown in FIGS. 10(6) and 11. The output terminals for delivering these signals $\phi_5$, $\phi_6$ are connected through the OR gates 23*n*, 23*p* to the AND gates 23*s*, 23*t* respectively.

The phase discrimination circuit 23*e* generates an output signal $\phi_7$ corresponding to the normal driving signals $\phi_1$, $\phi_2$. The output terminal of the phase discrimination circuit 23*e* is connected to the input terminals of the AND gates 23*k*, 23*l* and a selection gate 27*e* of a control circuit 27 to be described later. In addition, the output terminal of the phase discrimination circuit 23*e* is connected through the inverter 23*q* to the other input terminals of the AND gates 23*j*, 23*m* and selection gate 27*e* whose output terminal is connected to the selection gates 23*f*, 23*g* and compensation driving signal generation circuit 23*b*.

The output terminal of an OR gate 27*f* of the control circuit 27 is connected to the input terminals of the OR gates 23*n*, 23*p* and delay driving signal generation circuit 23*c*.

In FIG. 3, reference numeral 24 designates a driving circuit including two P channel MOS transistors 24*a*, 24*b* and two N channel MOS transistors 24*c*, 24*d*. Drains of the MOS transistors 24*a*, 24*c* are connected with each other, while drains of the MOS transistors 24*b*, 24*d* are connected with each other. Sources of the MOS transistors 24*a*, 24*b* are connected in common to the plus terminal $V_{DD}$ of an electrical supply source and sources of the MOS transistors 24*c*, 24*d* are connected in common to the minus terminal $V_{SS}$ of the electrical supply source. The gates of the four MOS transistors 24*a*, 24*b*, 24*c*, 24*d* are separated one from the other and the gate of the MOS transistor 24*a* is connected to the output terminal of the NOR gate 23*h* provided in the signal conversion circuit 23. The gate of the MOS transistor 24*b* is connected to the output terminal of the NOR gate 23*i* provided in the signal conversion circuit 23, the gate of the MOS transistor 24*c* is connected to the output terminal of the AND gate 23*s* provided in signal conversion circuit 23 and the gate of the MOS transistor 24*d* is connected to the output terminal of the AND gate 23*t*.

In FIG. 3, reference numeral 25 designates an electromagnetic coil of the step motor having ends connected between common drains $a_o$, $b_o$ of the driving circuit 24.

Reference numeral 26 shows a shock detection circuit composed of an inverter 26*a* having an input terminal connected to the common drain $a_o$ of the driving circuit 24, an inverter 26*b* having an input terminal connected to the output terminal of the inverter 26*a*, an AND gate 26*e* having an input terminal connected to the output terminal of the inverter 26*b*, an inverter 26*c* having an input terminal connected to the common drain $b_o$ of the driving circuit 24, an inverter 26*d* having an input terminal connected to the output terminal of the inverter 26*c* and an AND gate 26*f* having an input terminal connected to the output terminal of the inverter 26*d*. The output terminals of the AND gates 26*e*, 26*f* are connected to the input terminals of AND gates 27*a*, 27*b*.

The control circuit 27 is composed of the AND gates *27a*, *27b*, R-S flipflops *27c*, *27d*, the selection gate *27e* and the OR gate *27f*. The output terminal of the AND gate *27a* is connected to the set terminal of the R-S flipflop *27c*, the output terminal of the AND gate *27b* is connected to the set terminal of the R-S flipflop *27d*, the output terminal of the R-S flipflop *27c* is connected to the selection gate *27e* and to the input terminal of the OR gate *27f* and the negation output terminal of the R-S flipflop *27c* is connected to the input terminal of the AND gate *27b*. The output terminal of the R-S flipflop *27d* is connected to the selection gate *27e* and to the other input terminal of the OR gate *27f* and the not output terminal of the R-S flipflop *27d* is connected to the input terminal of the AND gate *27a*.

FIG. 4 shows a time chart at respective parts shown in FIG. 3 when the step motor is subjected to a reversely rotating shock at a time between the normal driving signals. Section I is a condition under which the shock load is absent and the outputs $\phi_{14}$, $\phi_{15}$ delivered from the shock detection circuit 26 are LOW (hereinafter will be called as L signals), so that the outputs $\phi_{18}$, $\phi_{19}$ delivered from the control circuit 27 are also the L signal. The NOR gate *23h* of the signal conversion circuit 23 generates a reverse signal $\phi_8$ of the normal driving signal $\phi_1$, the reverse signal $\phi_8$ being supplied to the gate of the MOS transistor *24a* and to one of the input terminals of the AND gate *23s*. To the other input terminal of the AND gate *23s* is supplied the electromagnetic coil switching signal $\phi_5$ so that the AND gate *23s* generates a signal such as $\phi_{10}$. Meanwhile, the output signal $\phi_9$ delivered from the NOR gate *23i* is a HIGH signal (hereinafter will be called as H signal) so that the electromagnetic switching signal $\phi_6$ becomes the output signal $\phi_{11}$ delivered from the AND gate *23t*. If the signal $\phi_8$ is changed over from the H signal to the L signal, the MOS transistors *24a*, *24d* shown in FIG. 3 become ON to cause current to flow through the electromagnetic coil 25 in $a_o \rightarrow b_o$ direction, thereby rotating the rotor in a given direction.

FIGS. 8(1) and 8(2) show a step motor for electronic timepieces used in general and composed of a stator 101, 102 and 201, 202; a rotor 103 and 203; and an electromagnetic coil 104 and 204. The pulse width of the driving signal $\phi_8$ is set to $t_1$ msec and the electromagnetic coil switching signal $\phi_{10}$ is not generated during $t_2$ msec after the driving pulse $\phi_8$ has been supplied to the AND gate *23s*. This is because of the fact that the shock detection circuit 26 does not detect the induced voltage due to the free oscillation of the rotor after it has been normally driven. If use is made of the duration $t_2$ msec for the purpose of detecting the conventional wheel train load, a signal which becomes L signal during $t_1+t_2$ msec is supplied to the AND gates *26e*, *26f* instead of their input signals $\phi_8$, $\phi_9$ so as not to generate during this time the shock detection outputs $\phi_{14}$, $\phi_{15}$.

Figure 2:
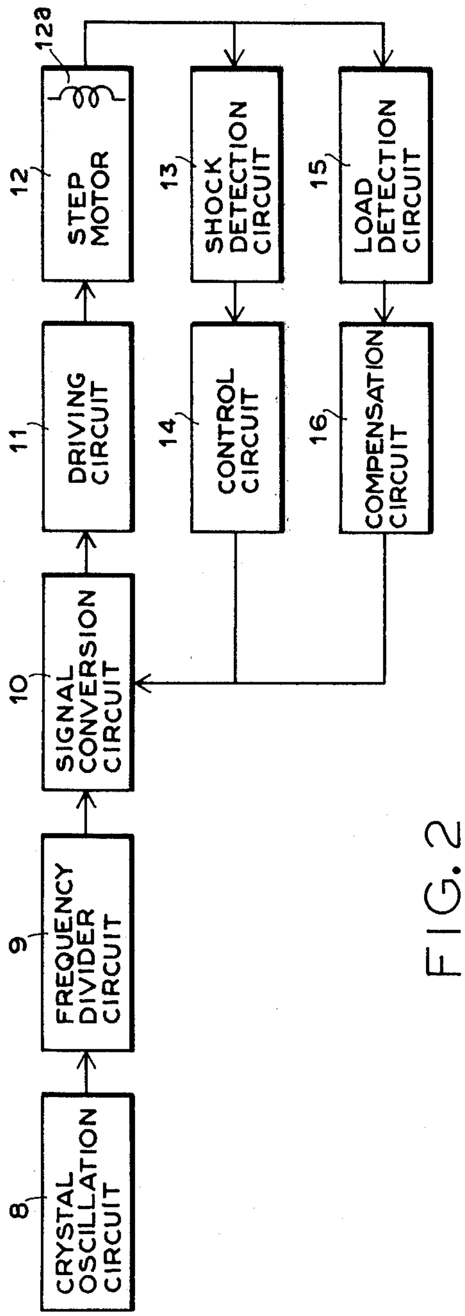
FIG. 2 is a block diagram of another embodiment of an electronic timepiece as a whole combined with load detection and compensation circuits according to the invention.

FIG. 2 shows another embodiment of an electronic timepiece as a whole according to the present invention. The electronic timepiece shown in FIG. 2 is the same in connection and arrangement as that shown in FIG. 1, but further comprises a load detection circuit 15 connected in parallel with the shock detection circuit 13 in order to prevent the generation of the shock detection outputs $\phi_{14}$, $\phi_{15}$ during the time $t_1+t_2$ msec. After the lapse of $t_2$ msec, the electromagnetic coil switching signals $\phi_5$, $\phi_6$ are generated and supplied to respective input terminals of the AND gates *23s*, *23t* whose outputs $\phi_{10}$, $\phi_{11}$ are supplied to the gates of the MOS transistors *24c*, *24d*. The operation of the driving circuit 24 by means of the electromagnetic coil switching signals $\phi_5$, $\phi_6$ will be described later in detail.

In section II shown in FIG. 4, NOR gate *23i* of the signal conversion circuit 23 generates a reverse signal $\phi_9$ of the normal driving signal $\phi_2$ which is supplied to the gate of the MOS transistor *24b* and to one of the input terminals of the AND gate *23t*. If the signal $\phi_9$ is changed over from an H signal to an L signal, the MOS transistors *24b*, *24c* only shown in FIG. 3 become ON to cause current to flow the electromagnetic coil 25 in $b_o \rightarrow a_o$ direction, thereby rotating the rotor in a given direction. From $t_2$ msec after the driving signal has been supplied, the electromagnetic coil switching signals $\phi_5$, $\phi_6$ are generated from the electromagnetic coil switching signal generation circuit *23d* and supplied as respective outputs $\phi_{10}$, $\phi_{11}$ delivered from the AND gates *23s*, *23t* to the driving circuit 24.

FIG. 10 illustrates the operation of the driving circuit 24 by means of the electromagnetic coil switching signals $\phi_{10}$, $\phi_{11}$. The driving signals $\phi_8$, $\phi_9$ are H signals and the P channel MOS transistors *24a*, *24b* are OFF, so that it is sufficient to consider the operation of the N channel MOS transistors *24c*, *24d*.

Under the condition shown in FIG. 10(1), both the electromagnetic coil switching signals $\phi_{10}$, $\phi_{11}$ are H signals so that the transistors *24c*, *24d* become ON. The resistances under conduction conditions of the transistors *24c*, *24d* and the electromagnetic coil 25 form a closed circuit. Under such condition, if the step motor is subjected to shock, the movement of the rotor causes the induced voltage to be generated in the coil 25 to make current flow therethrough.

Under the condition shown in FIG. 10(2), the transistor *24d* becomes OFF. Immediately before this condition, if current i flows through the electromagnetic coil 25, it generates the induced voltage L(di/dt) since the input impedance of the shock detection inverter *26c* is considerably large, and as a result, it is possible to know that the step motor is under shock load.

Under the condition shown in FIG. 10(3), the electromagnetic coil 25 is connected in the closed circuit.

Under the condition shown in FIG. 10(4), the transistor *24c* becomes OFF and the shock detection inverter *26a* is set to be supplied with the induced voltage. The shock detection inverters *26c*, *26a* are alternately operated. This is because of the fact that the MOS transistors *24a*, *24b*, *24c*, *24d* have parasitic diodes *24e*, *24f*, *24g*, *24h*, respectively, (see FIG. 10(5)) and that lower than −0.3 V of the negatively induced voltage becomes clamped so that it is necessary to utilize the positively induced voltage only.

Figure 11:
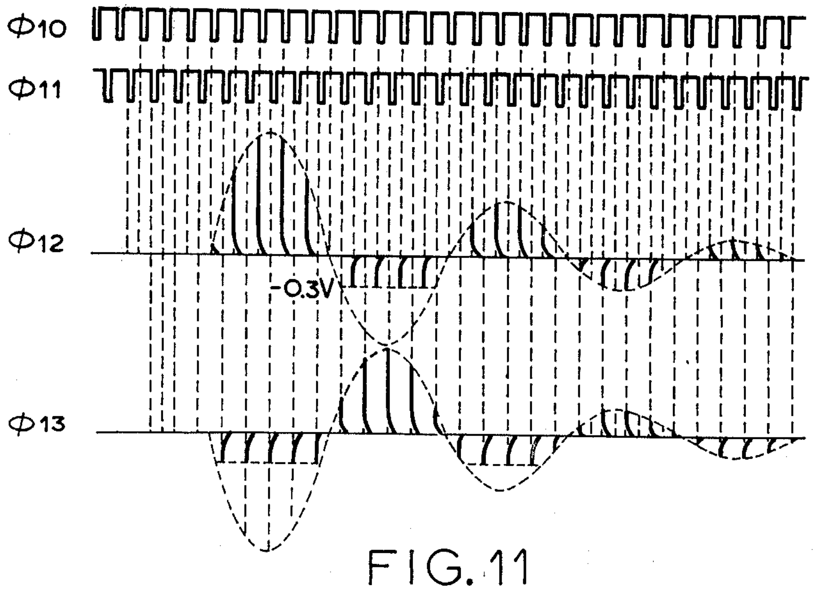
FIG. 11 is a wave form diagram illustrating induced voltage wave forms to be generated at the electromagnetic coil by means of the electromagnetic coil switching signal when the step motor is subjected to the shock.

FIG. 11 shows the induced voltage in the electromagnetic coil 25. As shown in FIG. 11, the electromagnetic coil 25 generates at its terminal $a_o$ a signal $\phi_{12}$ and at its terminal $b_o$ a signal $\phi_{13}$ which is reverse with respect to the signal $\phi_{12}$.

FIGS. 9(1), 9(2), 9(3) and 9(4) show envelopes of the waves of the induced voltage signal $\phi_{12}$ viewed at the terminal $a_o$ of the electromagnetic coil 25. FIG. 9(1) shows the signal $\phi_{12}$ generated when the step motor is subjected to a shock after the driving pulse $\phi_8$ has been supplied to the driving circuit 24 and the step motor has rotated by 1 step and then come to a standstill. FIG. 9(2) shows the signal $\phi_{12}$ generated when the step motor is subjected to a shock after the driving pulse $\phi_9$ has been supplied to the driving circuit 24 and the step motor has rotated by 1 step and then came to a standstill. FIGS.

9(1) and 9(3) show forwardly rotating shock waves and FIGS. 9(2) and 9(4) show reversely rotating shock waves. The wave shown in FIG. 9(4) can be detected by the shock detection inverter 26*a*. The wave shown in FIG. 9(2) must be detected by the shock detection inverter 26*c*.

In the section II shown in FIG. 4, if the step motor is subjected to a reversely rotating shock, in the first place the output $\phi_{14}$ is delivered from the shock detection circuit 26 and supplied to the input terminal of the AND gate 27*a* of the control circuit 27. In this case, the R-S flipflops 27*c*, 27*d* together with the outputs $\phi_{16}$, $\phi_{17}$ thereof are set to 0 and the not output $\overline{\phi_{17}}$ is the H signal. The signal $\phi_{14}$ functions to set through the AND gate 27*a* the R-S flipflop 27*c* 1. As a result, the not output $\overline{\phi_{16}}$ becomes the L signal so that the signal $\phi_{15}$ can not pass through the AND gate 27*b*. As a result, the output $\phi_{17}$ remains as the L signal.

That is, if the first positive direction voltage of the induced voltage due to a shock is detected by the inverter 26*a*, an not output $\overline{\phi_{16}}$ becomes the H signal. If the first positive direction voltage of the induced voltage due to the shock is detected by the inverter 26*c*, the signal $\phi_{17}$ becomes the H signal.

The phase discrimination circuit 23*e* of the signal conversion circuit 23 is set so as to deliver an L signal output by means of the ordinary driving signal $\phi_8$ and deliver an H signal output by means of the reversing signal $\phi_9$. In this case, the reversing signal $\phi_9$ causes the phase discrimination circuit 23*e* to deliver an H signal, so that the control circuit output $\phi_{19}$ is generated, thereby showing that the step motor is subjected to an reversely rotating shock. The control circuit output $\phi_{18}$ becomes an H signal during $t_5$ m sec to cause the compensation driving signal generation circuit 23*b* to generate its output $\phi_3$ which becomes the compensation driving signal which is in phase with the reversing signal $\phi_9$. This compensation driving signal functions to correct the erroneous operation when the step motor becomes reversely rotated by the shock.

When the step motor is not reversely rotated, this compensation driving signal does not operate the rotor, so that there is no inconvenience.

After a shock has been detected, the electromagnetic switch signal can be stopped. In the present embodiment, in order to improve the stability of the electronic timepiece circuit, the OR gate output $\phi_{19}$ of the control circuit 27 is set such that it becomes an H signal irrespective of the direction of shock after the shock has been detected and that the electromagnetic switching signal is prohibited during a given time.

Figure 5:
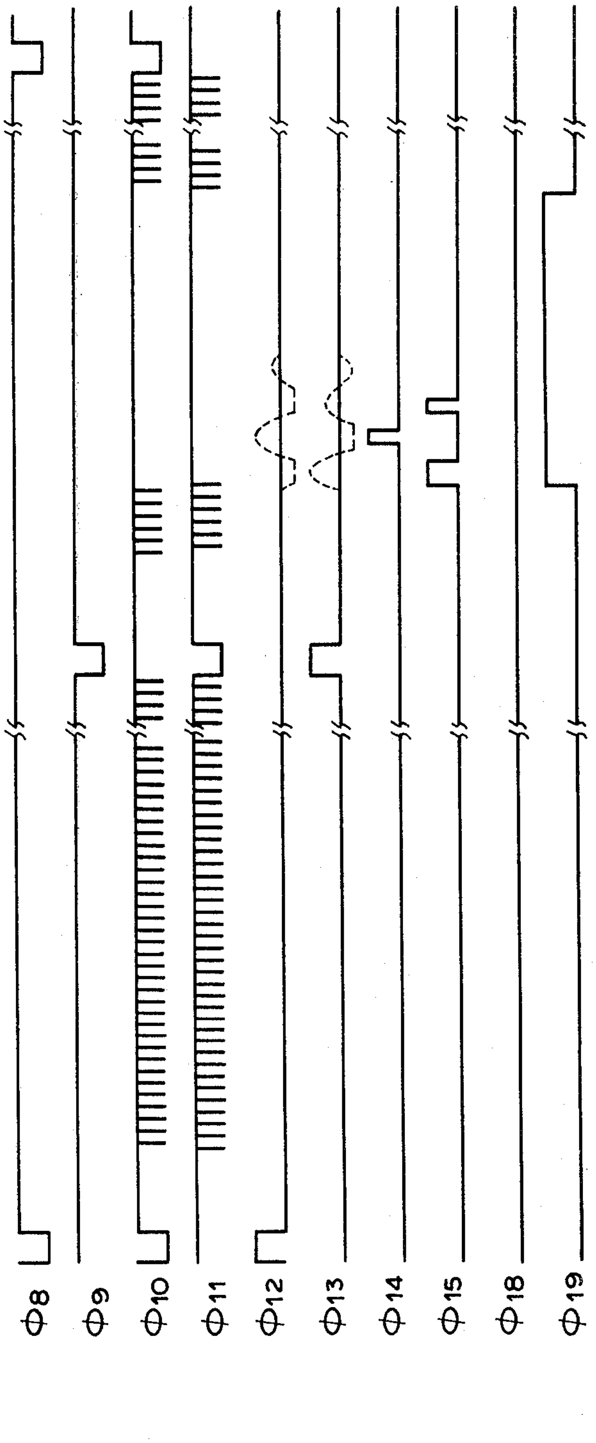
FIG. 5 is a time chart illustrating output signals delivered from respective parts shown in FIG. 3 under the condition in which the step motor is subjected to the forwardly rotating shock.

FIG. 5 shows a time chart at respective parts shown in FIG. 3 when the step motor is subjected to a forwardly rotating shock at a time between the normal driving signals in a similar manner as that shown in FIG. 4. Contrary to the case shown in FIG. 4, the signal $\phi_{15}$ becomes the first detection output and the signal $\phi_{17}$ becomes an H signal. The output signal $\phi_{18}$ delivered from the control circuit 27 remains as an L signal, and as a result, the compensation driving signal $\phi_3$ is not generated. The output signal $\phi_{19}$ becomes an H signal and the electromagnetic coil switching signal is prohibited for a given time.

If the step motor is subjected to a forwardly rotating shock, even when the rotor is forwardly rotated by 1 step, the rotor is not operated by the normal driving signal and the erroneous operation is compensated. As a result, it is not necessary to generate the compensation driving signal.

Figure 6:
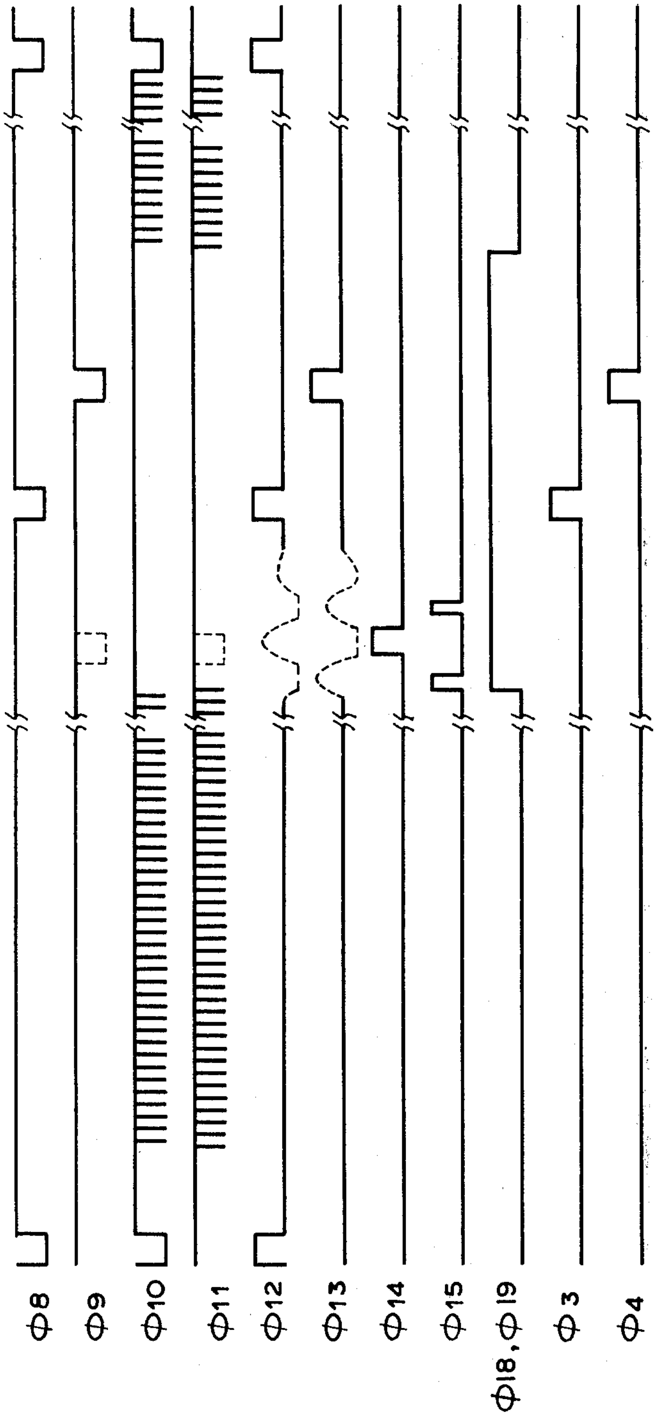
FIG. 6 is a time chart illustrating output signals delivered from respective parts shown in FIG. 3 under the condition in which the step motor is subjected to the reversely rotating shock immediately before generation of the normal driving signal.

FIG. 6 shows a time chart at respective parts shown in FIG. 3 when the step motor is subjected to the reversely rotating shock immediately before the step motor is subjected to the normal driving signal $\phi_9$. As shown in FIG. 6, in the first place, the output signal $\phi_{15}$ is generated to make the output signal $\phi_{17}$ of the R-S flipflop 27*d* an H signal. Since the not signal $\overline{\phi_7}$ of the output signal $\phi_7$ delivered from the phase discrimination circuit 23*e* is also an H signal, the output signal $\phi_{18}$ delivered from the control circuit 27 becomes an H signal. As a result, a compensation pulse is generated after the shock has ceased and the normal driving pulse $\phi_9$ is delayed and then supplied to the driving circuit 24. As a result, it is possible to correct the erroneous operation of the step motor even when it is rotated in the reverse direction by the shock.

Figure 7:
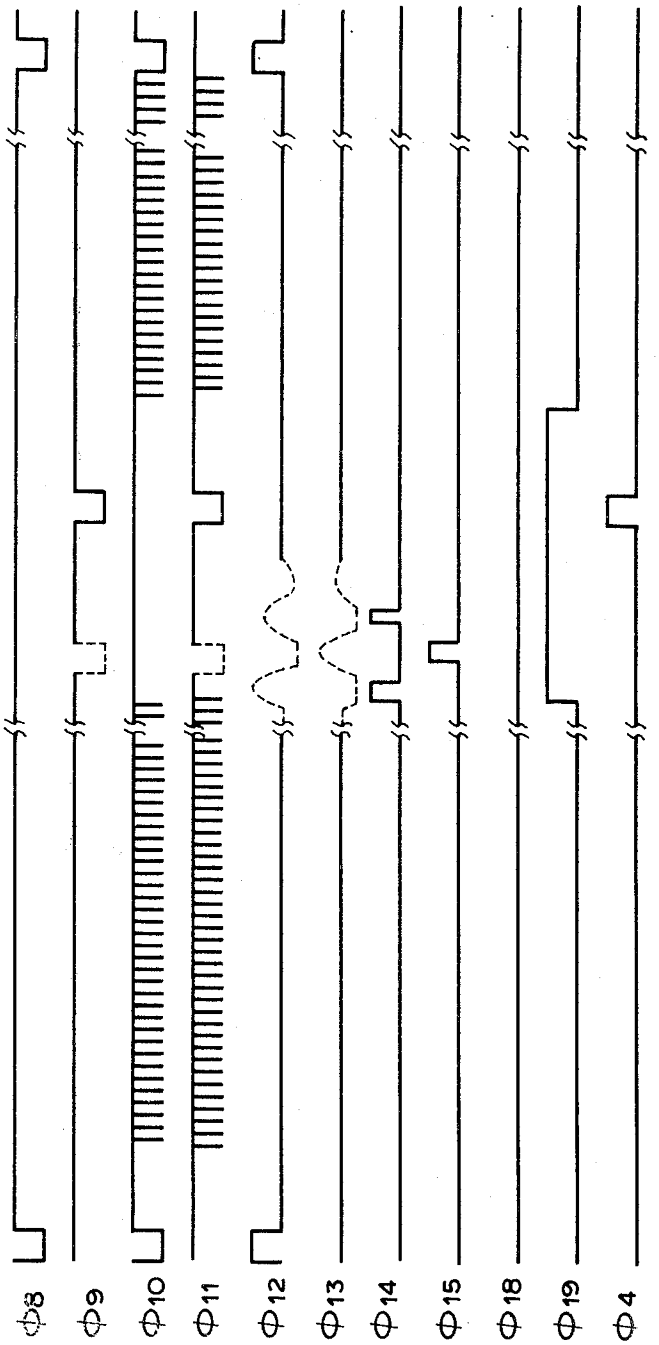
FIG. 7 is a time chart illustrating output signals delivered from respective parts shown in FIG. 3 under the condition in which the step motor is subjected to the forwardly rotating shock immediately before generation of the normal driving signal.

FIG. 7 shows a time chart at respective parts shown in FIG. 3 when the step motor is subjected to the forwardly rotating direction immediately before the step motor is subjected to the normal driving pulse $\phi_9$. As shown in FIG. 7, the normal driving pulse $\phi_9$ is delayed and supplied to the driving circuit after the shock has ceased.

As stated hereinbefore, the electronic timepiece according to the invention is capable of correcting the erroneous operation of the step motor by means of a compensation signal if the step motor is subjected to an external shock load in such direction that the shock tends to reversely rotate the step motor, of delaying the normal driving signal if the step motor is subjected to an external shock load immediately before the normal driving signal and hence preventing the erroneous operation of the step motor, thereby significantly improving the stability of the electronic timepiece, and decreasing the drag torque produced between the rotor and the stator of the step motor and hence decreasing the power input required for rotating the rotor by 1 step, thereby considerably reducing the consumed electric power.

What is claimed is:

1. In an electronic timepiece comprising a step motor composed of an electromagnetic coil excited by a two phase alternating driving signal, a permanent magnet rotor and a stator, the improvement comprising means for changing over said electromagnetic coil from a closed circuit condition to an open circuit condition and vice versa, means for detecting shocks and operative to detect an induced voltage to be generated in the electromagnetic coil when said rotor under its standstill condition is subjected to an external shock, means for discriminating the shock direction and operative to discriminate the shock direction by the difference between the output delivered from said shock detection means and the driving signal, and means for controlling the driving signal on the basis of the output delivered from said shock direction discriminating means.

2. The electronic timepiece according to claim 1, wherein said means for changing over said electromagnetic coil is composed of a signal conversion circuit including an electromagnetic coil switching signal generation circuit and a driving circuit including two P channel MOS transistors and two N channel transistors, gates of these MOS transistors being connected to said signal conversion circuit and common drains being connected to said electromagnetic coil of said step motor.

3. The electronic timepiece according to claim 1, wherein said means for changing over said electromagnetic coil includes a signal conversion circuit, and said means for detecting shocks is composed of inverters connected to said electromagnetic coil and AND gates connected through inverters to said inverters, respectively, the other input terminals of said AND gates being connected to said signal conversion circuit.

4. The electronic timepiece according to claim 1, wherein said means for discriminating the shock direction is composed of a signal conversion circuit, including a phase discrimination circuit, and a shock detection circuit connected to said electromagnetic coil.

5. The electronic timepiece according to claim 1, wherein said means for changing over said electromagnetic coil includes a signal conversion circuit, and said means for controlling the driving signal is composed of R-S flipflops connected through AND gates to said shock detection means connected to said electromagnetic coil on the one hand and connected through a selection gate and an OR gate to said signal conversion circuit.

* * * * *